United States Patent Office 3,407,239
Patented Oct. 22, 1968

3,407,239
SYNTHESIS OF UNSATURATED BICYCLIC
HYDROCARBONS
Nazzareno Cameli, Milan, Gaetano Censolo, Ferrara, and Guido Sartori and Alberto Valvassori, Milan, Italy, assignors to Montecatini Edison S.p.A., Milan, Italy, a corporation of Italy
No Drawing. Continuation of application Ser. No. 490,079, Sept. 24, 1965. This application Sept. 25, 1967, Ser. No. 670,460
Claims priority, application Italy, Sept. 25, 1964, 20,661/64
11 Claims. (Cl. 260—666)

The present invention relates to an improved method for the synthesis of unsaturated bicyclic hydrocarbons with condensed nuclei. This application is a continuation of Ser. No. 490,079 filed Sept. 24, 1965, and now abandoned.

More particularly the present invention relates to an improved method for the synthesis of hydrocarbons having the general formula

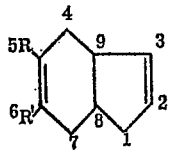

in which R and R' are the same or different and may be hydrogen atoms or methyl group.

These hydrocarbons, as is known, are obtained by reacting according to the Diels-Alder reaction a cyclic diene, more particularly cyclopentadiene, with an acyclic conjugated diolefin, more particularly butadiene, isoprene or dimethylbutadiene.

Rather low yields of pure product have been obtained previously since, together with the mixed dimers, large amounts of homodimers, high boiling products and solid products are also obtained.

By operating at temperatures of about 145° C. cyclopentadiene prevailingly behaves as a diene while the acyclic diolefins prevailingly behave as dienophilic compounds. Thus endocyclic compounds are obtained having the structural Formula I and, in a minor amount, compounds having the Formula II

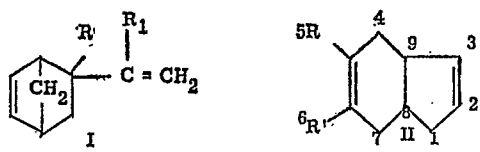

in which R and R' are hydrogen atoms or methyl groups.

By operating at temperatures higher than 180° C., on the other hand, the acyclic diolefin prevailingly behaves as a diene and cyclopentadiene prevailingly behaves as the dienophilic compound. In this case the compound of type (II) prevails.

The necessity of operating at such high temperatures in order to obtain compounds of this last type, however, leads to an increase in the formation of polymer and of homodimers, resulting in non-profitable consumption of the starting compounds.

The formation of homodimers also leads to another disadvantage which is particularly remarkable in the case of the reaction between cyclopentadiene and isoprene. In this case, the desired product, 6 - methyl - 4,9,7,8 - tetrahydroindene and the homodimers of cyclopentadiene and isoprene have nearly the same boiling point and it is therefore difficult to obtain the desired pure compound.

It has now been found according to the present invention that it is possible to substantially reduce some of the aforementioned disadvantages and to completely eliminate other disadvantages, with an increase in the yield of pure products.

It is also possible to use as strating material not only cyclopentadiene but also dicyclopentadiene or mixtures of these two hydrocarbons without detrimentally influencing the final results.

According to the present invention the co-dimerization of cyclopentadiene, dicyclopentadiene or mixtures of both compounds with conjugated acyclic diolefins including butadiene, isoprene and dimethylbutadiene is carried out by an improved process in which:

(a) The reaction is carried out in the presence of a solvent, (b) The monomers to be co-dimerized are introduced into a reaction vessel preheated to a temperature between 80 and 250° C., preferably between 150 and 250° C.

(c) At least a part of the reaction product obtained from the dimerization reaction is subjected to pyrolysis at a temperature between 300 and 900° C. The reaction product before the pyrolysis includes the desired unsaturated bicyclic compounds together with the compounds of type (I), the unreacted starting monomers, homodimers formed from the starting monomers, polymers and other high boiling point products and low boiling point products including the diluent inert solvent. As a result of the pyrolysis the starting monomers are obtained together with the codimers.

The compounds of type (I) disappear completely during the pyrolysis. By carrying out the codimerization within the preferred temperature range of from 150 and 250° C., the ratio between compounds of type I and compounds of type II, decreases down to about 0 with increasing temperature values. This constitutes a particular advantageous feature of the process of the present invention. However, even when the compounds of type I are present in the reaction mixture they disappear by virtue of the pyrolysis.

By carrying out the reaction in the presence of a solvent, the formation of polymer is substantially reduced.

As solvents, various types of inert compounds can be used such as aromatic aliphatic or cycloaliphatic hydrocarbons having from 5 to 10 carbon atoms. For example, n-heptane, n-octane, benzene, toluene, xylene, cyclohexane may be used.

By introducing cyclopentadiene, dicyclopentadiene or mixtures thereof and the aliphatic diene into the reaction vessel preheated to the desired reaction temperature, a further reduction in the amount of polymer and of homodimer is obtained.

The reaction product or the residues obtained from distilling the reaction product to remove low boiling point fractions is then subjected to heating, for example, by passing it through a quartz tube filled with quartz rings. The tube can be inserted into an electrically heated furnace and a slight depression applied to it in order to facilitate the removal of the vapors formed by pyrolysis.

The pyrolysis may be carried out in one or two steps. In the first step temperatures of between 300 and 500° C., preferably of between 350 and 450° C. are used.

The residue obtained from the first pyrolysis step, after distillation of the low boiling products (B.P. <200° C.), may then be subjected to a second pyrolysis and preferably between 500 and 900° C. A further recovery of the starting monomers is thus obtained.

If the pyrolysis is carried out in a single step the temperatures range between 300 and 500° C., preferably between 350° and 450° C.

The pyrolysis step results in the formation of mixed dimer together with the starting reactants, cyclopentadiene and aliphatic diene. This result may be due in part to depolymerization. These starting reactants may be fed again to the reaction vessel. An almost complete absence of low boiling decomposition products and of carbon residues is observed after the pyrolysis step.

As mentioned above, either the entire reaction product obtained from the dimerization reaction or the residues obtained from distilling off the low boiling point fractions may be subjected to the pyrolysis step. However, the process can be conveniently shortened and improved by directly charging into the pyrolysis tube the reaction mass obtained from the dimerization step without first distilling off the low boiling point fractions.

The gas chromatographic analysis of the reaction mass after pyrolysis shows the complete absence of dicyclopentadiene, which has been monomerized to cyclopentadiene and of the band corresponding to the compound of the type (I), which has been in part isomerized to compound (II), and in part decomposed into the starting monomers.

According to another characteristic of the process according to the present invention, by carrying out the reaction in the presence of an *excess* of cyclopentadiene, dicyclopentadiene or mixtures thereof with respect of the stoichiometric amount required to form compound (II), the amount of homodimers of the aliphatic diene is remarkably reduced. Molar ratios of cyclopentadiene, dicyclopentadiene and mixtures thereof to aliphatic diene of from 2:1 to 5:1 are preferred. The dicyclopentadiene excess present in the reaction mass is then completely recovered as cyclopentadiene in the subsequent pyrolysis. An excess of linear diolefin leads to a great amount of the corresponding polymers, which are difficult to pyrolize. Thus an excess of linear diolefin results in a lower conversion rate.

It should be stressed that under the synthesis conditions according to the present invention, substantially the same results are obtained by starting either from cyclopentadiene, from dicyclopentadiene or from mixtures thereof.

Another important fact, as regards the economy of the process, is the possibility of using both as solvent and as monomer feed petroleum cracking fractions containing one or both of the monomers required for the synthesis. In this case the addition of an extraneous diluent solvent is not necessary as it is present in the petroleum cracking fraction.

The reaction may be carried out under atmospheric pressure or above atmospheric pressure. It is preferable to operate in an autoclave under autogenous pressure. The pressure in this case will depend on the temperature and on the composition of the reaction mixture. Pressures above 20 atmospheres are generally not used.

As regards the reaction times, it has been observed that under the synthesis conditions according to the present invention times between 30 minutes and 4 hours are sufficient, when the temperatures ranges from 150 to 250° C. The conversion of aliphatic diene under the preferred reaction conditions amounts to 85% after 30 minutes and to 96% after 60 minutes.

The reaction may be carried out in the presence of a polymerization inhibitor so as to prevent the alphatic diolefin from polymerizing. As inhibitors, tert. butyl catechol and other phenols such as hydroquinone may be used.

The process may be conveniently carried out either batchwise such as in an autoclave, or continuously, for example, by passing the reacting substances through a suitably sized tubular reactor.

The following examples illustrate the invention but are not to be construed as limiting its scope.

Example 1

2. g. of hydroquinone and 1,200 cm.$^3$ of benzene are introduced in a 3-litre autoclave under a nitrogen atmosphere. The whole is heated to 190° C. and, when this temperature is reached, 330 g. of isoprene (4.85 mols) and 320 g. of cyclopentadiene (4.85 mols) are charged. The autoclave is agitated at a temperature of 190°–200° C. for 2 hours and 30 minutes.

The discharged cold mass from the autoclave is subjected to distillation, first under atmospheric pressure, in order to remove benzene, and then under vacuum. 428 g. of liquid phase and 220 g. of residue are thus obtained. By quantitative chromatographic analysis, the liquid phase appears to consist of 327.8 g. of 6-methyl-4,9,7,8-tetrahydroindene, 90 g. of homodimers and 11.2 g. of 5-isopropenyl-norbornene.

The 220 g. of residue are slowly dropped into a quartz tube filled with quartz rings, inserted in a vertical oven. The diameter of the quartz tube is 3 cm. and the height of the packing is 45 cm. The reaction is carried out at 400° C. under a pressure of 350 mm. Hg. The vapors formed are condensed at the tube outlet in a vessel cooled with methanol and Dry Ice.

The 214 g. of discharged product, when subjected to distillation, consists of 14.5 g. of isoprene, 39 g. of cyclopentadiene, 33 g. of 6-methyl-4,9,7,8-tetrahydroindene and 127.5 g. of residue.

This residue is slowly dropped into a quartz tube with an inner diameter of 3 cm. filled with copper wire to a height of 10 cm., and maintained at a temperature of 720–730° C. under a pressure of 2 mm. Hg. 118 g. of product containing 20 g. of isoprene, 20 g. of cyclopentadiene and 78 g. of high boiling liquid are obtained.

The total yield of methyl tetrahydroindene with respect to converted isoprene therefore is 62%.

Example 2

1 g. of hydroquinone and 300 cm.$^3$ of benzene are introduced into a 2-litre autoclave. The autoclave is heated to 190° C. and, when this temperature is reached, 80 g. of dicyclopentadiene and 82.5 g. of isoprene are charged. The autoclave is kept in agitation at a temperature of 190–200° C. for 2 hours and 30 minutes.

The discharged cold mass from the autoclave is freed of benzene by distillation. The residue of this distillation is then introduced dropwise into the tube described in Example 1 and under the same conditions. From 160 g. of mass charged into the tube 158 g. of a mixture consisting of 7 g. of isoprene, 36 g. of cyclopentadiene, 20 g. of isoprene homodimers, 76.7 g. of 6-methyl-4,9,7,8-tetrahydroindene and 18.3 g. of residue are obtained.

The yield of methyltetrahydroindene with respect to converted isoprene is 53%.

Example 3

2. g. of hydroquinone and 1,200 cm.$^3$ of benzene are introduced into a 3-litre autoclave under a nitrogen atmosphere. The autoclave is heated to 190° C. and, when this temperature is reached, 365 g. (5.5 mols) of cyclopentadiene and 166 g. (2.45 mols) of isoprene are charged. The autoclave is kept in agitation at a temperature of 190–200° C. for 2.5 hours.

The cold mass discharged from the autoclave is freed of benzene by distillation. The residue from this distillation is then introduced dropwise into a quartz tube with a diameter of 3 cm. filled with quartz rings. The packing zone has a height of 75 cm. and is heated by a vertical electric oven. The reaction is carried out at a temperature of 400° C. under a pressure of 650 mm. Hg. From 529 g. of mass charged in the tube, 524 g. of a mixture consisting of 17 g. isoprene, 243.8 of cyclopentadiene, 20 g. isoprene homodimers, 198 g. of 6-methyl-4,9,7,8-tetrahydroindene and 45.2 g. of residue are obtained.

The yield of methyl tetrahydroindene with respect to converted isoprene is 67%.

Example 4

1 g. of hydroquinone and 590 cm.$^3$ of benzene are introduced into a 2-litre autoclave under a nitrogen atmosphere. The whole is heated to 190° C. and, when this temperature is reached, 238 g. (3.6 mols) of cyclopentadiene and 49 g. (0.72 mol) of isoprene are charged. The autoclave is kept in agitation at a temperature of 190–200° C. for 2 hours and 30 minutes.

The cold mass discharged from the autoclave is freed of benzene by distillation. The residue from this distillation is then introduced dropwise into an electrically heated quartz tube. The height of the packing and the pressure and temperature conditions are identical with those described in Example 3. From 285 g. of mass charged in the tube 280 g. of a mixture consisting of 4.7 g. of isoprene, 185.5 g. of cyclopentadiene, 3.74 g. of isoprene homodimers, 67 g. of 6-methyl-4,9,7,8-tetrahydroindene and 18.76 g. of residue are obtained.

The yield of methyltetrahydroindene with respect to converted isoprene is 74%.

Example 5

1 g. of hydroquinone and 590 cm.$^3$ of benzene are introduced into a 2-litre autoclave under a nitrogen atmosphere. The whole is heated to 190° C. and, when this temperature is reached, 237 g. (1.795 mols) of dicyclopentadiene and 49 g. (0.72 mol) of isoprene are charged. The autoclave is kept in agitation at a temperature of 190–200° C. for 2 hours and 30 minutes.

The cold mass discharged from the autoclave is slowly introduced dropwise into an electrically heated quartz tube. The height of the packing and the temperature and pressure conditions are identical with those described in Example 3. From 794 g. of mass charged in the tube, 785 g. of a mixture consisting of 510 g. of benzene, 1.5 g. of isoprene, 170 g. of cyclopentadiene, 10.3 g. of isoprene homodimers, 70 g. of 6-methyl-4,9,7,8-tetrahydroindene and 23 g. of residue are obtained.

The yield of methyltetrahydroindene with respect to converted isoprene is 74%.

Example 6

129 g. of cyclopentadiene and 200 g. of a $C_5$ fraction of petroleum cracking, containing 56.7 g. of isoprene are introduced into a 1-litre autoclave containing 1 g. of hydroquinone, pre-heated to 190° C. The autoclave is kept in agitation at a temperature of 190–200° C. for 2 hours and 30 minutes.

The cold mass discharged from the autoclave is slowly introduced dropwise into an electrically heated quartz tube. The height of the packing, the temperature and pressure conditions and the operations are identical with those described in Example 3. From 320 g. of mass charged in the tube, 309 g. of a mixture containing 69 g. of 6-methyl-4,9,7,8-tetrahydroindene and 19 g. of residue are obtained.

The yield of methyltetrahydroindene with respect to the isoprene charged is 61%.

Example 7

1 g. of hydroquinone and 1,000 cm.$^3$ of benzene are introduced into a 3-litre autoclave under a nitrogen atmosphere. The whole is heated to 190° C. and, when this temperature is reached, 264 g. of cyclopentadiene and 330 g. of dimethylbutadiene are charged. The autoclave is kept in agitation at a temperature of 190°–200° C. for 3 hours and 30 minutes.

The cold mass discharged from the autoclave is subjected to distillation, first under atmospheric pressure to remove benzene and then under vacuum. 351 g. of liquid phase and 263 g. of residue are thus obtained. The liquid phase appears to consist of dicyclopentadiene (66 g.) 5,6-dimethyl-4,9,7,8-tetrahydroindene (188 g.) and dimethylbutadiene homodimer (77 g.).

The 263 g. of residue are slowly introduced dropwise into an electrically heated quartz tube. The height of the packing, the temperature and pressure conditions and the operations are identical with those described in Example 3.

55 g. of cyclopentadiene, 25 g. of dimethylbutadiene, 24 g. of 5,6-dimethyl-4,9,7,8-tetrahydroindene, 16 g. of dimethylbutadiene homodimer and 139 g. of residue are collected.

Example 8

100 g. of $C_5$ petroleum cracking fraction and 0.05 g. of tert. butylcatechol are introduced into a stainless steel shaking autoclave having the volume of 250 cm.$^3$. The temperature is quickly brought to 200° C. and the reaction is continued at this temperature for 2.5 hours. The autoclave is then quickly cooled to −40° C. and its content is poured into a vessel cooled to −60° C.

The gas-chromatographic analysis of the starting and end products is reported in Table 1.

Example 9

100 g. of $C_5$ fraction, 0.05 g. of tert. butylcatechol and 8.8 g. of cyclopentadiene are introduced into the same autoclave of Example 1. The molar ratio between isoprene and cyclopentadiene is 1:1. The procedure of Example 7 is then repeated.

The analysis of the products is reported in Table 1.

TABLE I

|  | Example 8 | | Example 9 | |
| --- | --- | --- | --- | --- |
|  | Grams, percent before reaction | Grams, percent after reaction | Grams, percent before reaction | Grams, percent after reaction |
| Saturated hydrocarbons having 4-6 C atoms | 37.6 | 36.9 | 33.7 | 33.9 |
| Olefinic compounds having 4-6 C atoms | 33.9 | 34.1 | 31.1 | 31.3 |
| Butadiene | 2.3 | 0.2 | 2.1 | 0.2 |
| Piperylene | 8.1 | 3.1 | 8.15 | 3.3 |
| Isoprene | 13.2 | 0.8 | 12.1 | 0.8 |
| 1-4 pentadiene | 0.7 | 0.3 | 0.64 | 0.3 |
| Cyclopentadiene | 4.4 | 0.1 | 4.4 | 0.1 |
| Isoprene dimers |  | 2.5 |  | 2.7 |
| Cyclopetadiene dimers |  | 0.6 |  | 1.8 |
| 6-methyl-tetrahydroindene |  | 5.0 |  | 9.5 |
| 7-methyl-tetrahydroindene |  | 1.2 |  | 2.3 |
| Tetrahydroindene |  | 0.5 |  | 1.2 |

Example 10

1 g. of hydroquinone and 317 cm.$^3$ of benzene are introduced into a 1-litre autoclave under a nitrogen atmosphere. The whole is heated to 190° C. and when this temperature is reached, 54 g. of butadiene and 132 g. of dicyclopentadiene are added. The autoclave is kept in agitation at a temperature of 190–200° C. during 2 hours and 30 minutes.

The mass discharged is distilled at first under atmospheric pressure in order to eliminate benzene and then at 20 mm. Hg 80 g. of a liquid phase (B.P. 40–70° C.) and 100 g. of a high boiling residue. The liquid phase contains 4,9,7,8 tetrahydroindene (48 g.), vinylcyclohexene (7, 2 g.), dicyclopentadiene (15 g.) and 2-vinyl-norbornene (5 g.).

The 100 g. of the high boiling residue, obtained after distillation of the liquid phase are introduced dropwise into a quartz tube electrically heated. The conditions of the pyrolysis are the same as those described in Examples 3. 95 g. of product consisting of 35 g. of cyclopentadiene and 60 g. of high boiling residue are obtained.

Example 11

The codimerization is carried out as in Example 5. The raw reaction product is introduced dropwise into a quartz tube, the lower portion of which is provided with a refrigerator connected with two vessels connected in series.

The second vessel is connected with a vacuum pump. The pyrolysis is carried out at 400° C. and 350 mm. Hg. The refrigerator and the first vessel are kept at 85° C. by means of a circulation of hot water: the second vessel is cooled to —78° C. The composition (in percentage by weight) of the mixture collected in the two vessels is as follows:

|  | Methyltetra-hydroindene | Benzene | Cyclopen-tadiene | Isoprene dimers | Polymers | Isoprene |
|---|---|---|---|---|---|---|
| First vessel | 40 | 39.7 | 0.4 | 5.9 | 14 | 0 |
| Second vessel | 0.65 | 71.8 | 27.2 | 0.12 | 0 | 0.25 |

Product collected in the first vessel 165 g.
Product collected in the second vessel 620 g.

Obviously, other modifications may be made in carrying out the invention without departing from the spirit thereof, and therefore we intend to include in the scope of the appended claims all variations which will be apparent to those skilled in the art from the disclosures made, and illustrative examples given, herein.

What is claimed is:

1. A process for the synthesis of unsaturated bicyclic hydrocarbons with condensed nuclei having the general formula

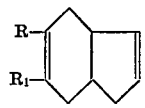

in which R and R₁ are selected from the group consisting of hydrogen and the methyl group, comprising preheating a solvent selected from the group consisting of aromatic, aliphatic and cycloaliphatic hydrocarbons to a temperature of from 80° C. to 250° C., introducing into the solvent maintained at the temperature in the range 80° C. to 250° C., a cyclo-diene selected from the group consisting of cyclopentadiene and dicyclopentadiene and mixtures thereof, and an acyclic conjugated diolefin selected from the group consisting of butadiene, isoprene and dimethylbutadiene, to form the said unsaturated bicyclic hydrocarbon of the formula given by reaction of said cyclo-diene and said acyclic diolefin at a temperature to which the solvent is preheated, and then subjecting at least a portion of the thus obtained reaction product to pyrolysis at a temperature of from 300 to 900° C.

2. The process according to claim 1, in which all of the product of said reaction between the cyclodiene and acyclic diolefin is subjected to pyrolysis.

3. The process according to claim 1, in which the portion of the reaction product which is subjected to pyrolysis is the residue remaining after distilling off the low-boiling point fraction of said reaction product.

4. The process according to claim 1, in which the inert solvent is preheated to 150–250° C.

5. The process according to claim 1, in which the pyrolysis is carried out at 350–450° C.

6. The process according to claim 1, characterized in that the said reaction is carried out under atmospheric pressure.

7. The process according to claim 1, characterized in that the said reaction is carried out above atmospheric pressure.

8. The process according to claim 1, in which the molar ratio between said cyclo-dienes and the acyclic diolefin is from 2:1 to 5:1.

9. The process according to claim 1, characterized in that the pyrolysis is performed in two steps, the first pyrolysis step being performed at a temperature of from 300° C. to 500° C., and the second pyrolysis step being performed at a temperature of from 500° C. to 900° C.

10. The process according to claim 9, in which the second pyrolysis is carried out between 500° and 900° C.

11. The process according to claim 1, in which the reaction is carried out in the presence of a polymerization inhibitor.

References Cited

UNITED STATES PATENTS

| 2,752,406 | 6/1956 | Segfried | 260—666 |
| 3,110,739 | 11/1963 | Bimber | 260—666 |
| 3,183,249 | 5/1965 | Wiese | 260—666 |

DELBERT E. GANTZ, *Primary Examiner.*

V. O'KEEFE, *Assistant Examiner.*